US005223040A

United States Patent [19]

de Cremoux

[11] Patent Number: 5,223,040

[45] Date of Patent: Jun. 29, 1993

[54] BATCH PROCESS AND APPARATUS FOR CRYSTALLIZING SYRUP

[75] Inventor: Jacques de Cremoux, Lille-Hellemmes, France

[73] Assignee: FCB, Montreuil, France

[21] Appl. No.: 784,368

[22] Filed: Oct. 29, 1991

[30] Foreign Application Priority Data

Nov. 22, 1990 [FR] France ................................ 90 14567

[51] Int. Cl.[5] ............................ C13F 1/02; B01D 9/00

[52] U.S. Cl. ........................................ 127/42; 127/15; 127/16; 127/58; 127/61

[58] Field of Search ........................ 127/15, 16, 58, 61, 127/42

[56] References Cited

U.S. PATENT DOCUMENTS 3,622,387 11/1971 Grandadam .......................... 127/16
4,016,001 4/1977 Hoks .................................... 127/61
4,848,321 7/1991 Chigusa ................................ 127/58

*Primary Examiner*—Theodore Morris
*Assistant Examiner*—P. L. Hailey
*Attorney, Agent, or Firm*—Collard & Roe

[57] ABSTRACT

A batch process of producing sugar crystals from syrup in a discontinuously operated crystallization apparatus comprising a heating calandria, comprises the steps of graining a batch of concentrated syrup by adding seed crystals thereto to form a magma, causing sugar crystals in the magma to grow by subjecting it to evaporation in heat exchange with the calandria and adding syrup while maintaining the mother liquor at a desired coefficient of supersaturation to obtain massecuite, increasing the brix of the massecuite to a desired value to obtain a final volume of massecuite which is substantially equal to the volume of the magma, and controlling the flow of steam to the calandria and the flow of added syrup at least during the growing phase of the sugar crystals so that the mother liquor is maintained at supersaturation and the level of the massecuite remains substantially constant. The calandria has a minimum height of 2 m and the control system is arranged to hold the level of massecuite produced in the evaporator vessel below a maximum level spaced above an upper plane of the calandria.

4 Claims, 2 Drawing Sheets

BATCH PROCESS AND APPARATUS FOR CRYSTALLIZING SYRUP

BACKGROUND OF THE INVENTION

1. Field of the Invention

The present invention relates to a batch process and an apparatus for producing sugar crystals from syrup in a discontinuously operated crystallization apparatus comprising a heating calandria, which comprises the steps of graining a batch of concentrated syrup by adding seed crystals thereto to form a predetermined volume of magma causing sugar crystals in the syrup to grow by subjecting the magma to evaporation in heat exchange with the calandria and adding syrup while maintaining the mother liquor at a desired level of supersaturation to obtain massecuite, and increasing the brix of the massecuite to a desired value to obtain a final volume of massecuite.

A description of the evaporation of sugar juice to produce syrup and the subsequent boiling of the syrup to produce massecuite has been described in Handbook of Cane Sugar Engineering, by E. Hugot, Elsevier Publishing Company, 1960, particularly pages 348-528.

2. Description of the Prior Art

Apparatus of this type comprises a closed vessel, whose interior is under sub-atmospheric pressure, a heating calandria at the bottom of the vessel, and a mechanical agitator for accelerating the circulation of the syrup fed into the vessel through the calandria. During each production cycle,the closed vessel is filled with a sufficient volume of syrup to cover the calandria at the bottom of the vessel, this volume of syrup is concentrated to bring it to a state of supersaturation and the syrup is grained by introducing a metered quantity of seed crystals to produce seeding magma (mixture of crystals and mother liquor), the sugar crystals in the magma are caused to grow by adding fresh syrup to compensate for the crystallization of the sugar in the mother liquor and the evaporation of water while maintaining the mother liquor at a state of supersaturation until the resultant massecuite attains a predetermined level in the pan, and finally the massecuite is densified to increase its brix value (content of dry substance) to the desired level.

Conventionally, vertical cylindrical vessels equipped with a calandria of low height (less than 1.5 m) have been used for boiling the syrup to reduce the volume of the seeding magma. During the phase of crystal growth, the level of the massecuite in the vessel rises progressively and, at the end of the boiling, the height of the massecuite above the upper plane of the calandria reaches about 1.5 m to 2 m, depending on whether the massecuite is subjected to natural circulation through the calandria or whether the vessel is equipped with a mechanical agitator to aid in the circulation. In the conventional apparatus, the volume of the seeding magma constitutes about 25% to 35% of the final volume of massecuite.

Because of the considerable height of the massecuite extending above the calandria, the static pressure in the lower part of the vessel is elevated and the boiling temperature of the mother liquor considerably exceeds the average temperature of the massecuite, which has two disadvantages:(1) it is necessary to supply the steam at elevated pressure and temperature to the calandria, and (2) there is a risk of partially redissolving the sugar crystals when they are recirculated to the bottom of the vessel. Furthermore, the agitation in the volume of massecuite above the calandria is weak, even in apparatus equipped with a mechanical agitator, and the massecuite therefore lacks homogeneity, particularly as far as the grain size of the sugar crystals is concerned.

SUMMARY OF THE INVENTION

It is the primary object of this invention to improve the batch production of massecuite by enhancing its thermal exchange and the circulation whereby the boiling time is reduced and the grain size of the sugar crystals is more uniform while making it possible to use steam at a lower pressure and temperature and regularizing the duration of the operating cycles.

The above and other objects are accomplished according to one aspect of the invention with a batch process of producing sugar crystals from syrup in a discontinuously operated evaporator apparatus comprising a calandria, which comprises the steps of graining a batch of concentrated syrup by adding seed crystals thereto to form a predetermined volume of magma, causing sugar crystals in the magma to grow by subjecting it to evaporation in heat exchange with the calandria and adding syrup to form a massecuite consisting of a mother liquor and sugar crystals and controlling the flow of steam to the calandria and the flow of added syrup so that the mother liquor is maintained at a desired level of supersaturation and the level of the massecuite is maintained substantially constant to obtain a final volume of massecuite which is substantially equal to the predetermined volume of magma.

To maintain the supersaturation at the desired level, which varies during the operating cycle, a representative parameter of the state of the massecuite is measured, the measured parameter is compared to a reference value which is a function of the time elapsed since the beginning of the operating cycle or the sugar crystal growing phase, and the flow of steam and/or the flow of added syrup are controlled so that any difference between the measured parameters and the reference value disappears.

According to another aspect, the present invention provides a crystallization apparatus for producing sugar crystals from syrup, which comprises a closed vessel, the calandria having a height of more than two meters, a mechanical agitator for circulating syrup fed into the vessel through the calandria, and a control system arranged to hold the level of massecuite produced in the vessel substantially constant and below a maximum level above an upper plane of the calandria.

The calandria may be comprised of vertical tubes preferably having a diameter of at least 150 mm or of concentrically arranged hollow annular plates or other hollow heating elements having equivalent hydraulic diameters.

BRIEF DESCRIPTION OF THE DRAWING

The above and other objects, advantages and features of this invention will become more apparent from the following detailed description of a now preferred embodiment thereof, taken in conjunction with the accompanying schematic drawing wherein.

DETAILED DESCRIPTION OF PREFERRED EMBODIMENT

Figure 1:
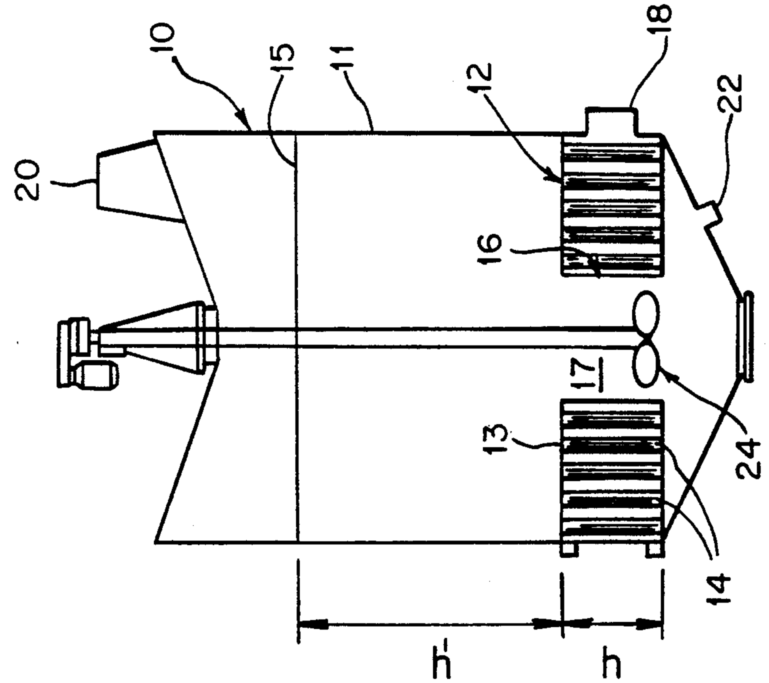
FIG. 1 (Prior Art)
FIG. 1 is a transverse section at the diametrical plane of a conventional crystallization apparatus.

FIG. 1 schematically illustrates a conventional crystallization apparatus (boiling pan) used in the sugar industry. It comprises closed cylindrical vessel 10 having a vertical axis and equipped, at its bottom, with tubular calandria 12. The illustrated calandria is composed of a multiplicity of vertical tubes 14, whose opposite ends are affixed to bores of two horizontal end plates 13, 13. The two end plates of the calandria, shell 11 of vessel 10 and an inner calandria shell 16, which is concentric with the vessel shell, define a calandria chamber into which steam is fed through steam inlet 18. The steam in the calandria chamber is condensated on the outer surfaces of tubes 14 and the heat from the steam is transmitted through the tube walls into the interior of the tubes where it heats the massecuite circulating therein upwardly. In this type of evaporator, the circulation of the massecuite in the vessel and through the calandria is produced by bubbles of vapor due to the heating, reinforced by mechanical agitator 24, which create an ascending movement of the massecuite in the tubes. The massecuite rising from the upper ends of tubes 14 is returned through center well 17 defined by shell 16 to reenter the calandria through the lower tube ends. The vapor produced by the evaporation process is evacuated through vapor outlet 20 at the top of closed vessel 10, and this vapor outlet is connected to a condenser which creates a partial vacuum in the interior of the vessel. Fresh syrup is fed into the vessel through inlet 22 at the bottom of the vessel below calandria 12.

In the conventional apparatus of this type, height h of calandria tubes 14 varies between 0.8 m and 1.2 m, and height h' of the massecuite above the calandria is of the order of 1.5 m at the end of the operating cycle, as indicated by level 15 of the produced massecuite. The diameter of tubes 14 is of the order of 100 mm.

Figure 2:
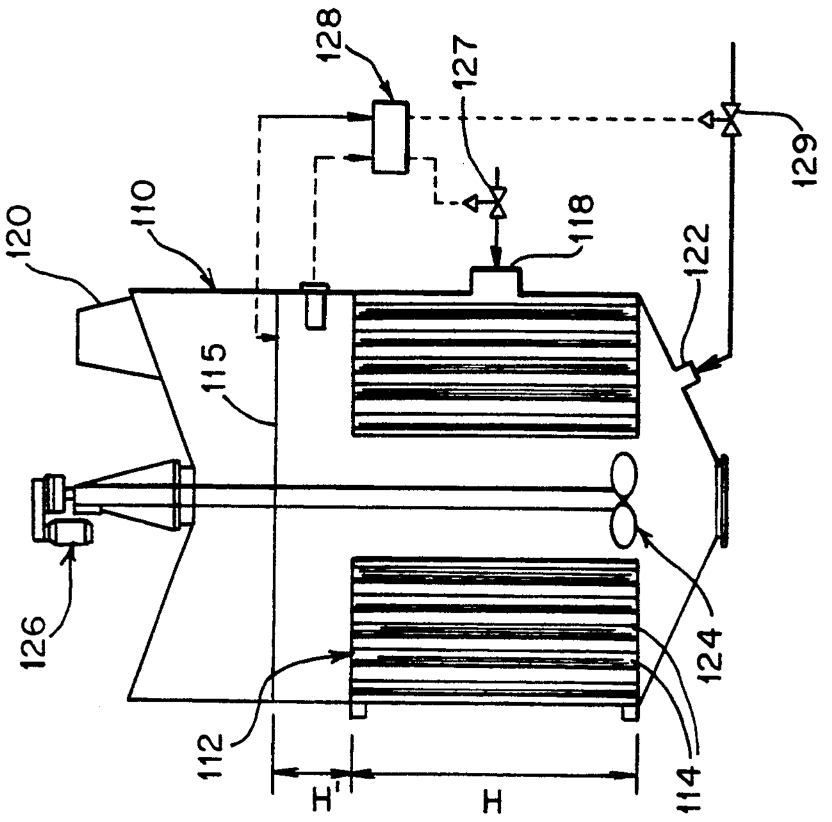
FIG. 2 is a like view of a crystallization apparatus according to the invention.

FIG. 2 illustrates a crystallization apparatus of the identical type but modified in accordance with the present invention. As shown, height H of tubular calandria 112, as compared to the height of the cylindrical vessel 110, is much greater,than in the conventional apparatus shown in FIG. 1. According to this invention height H exceeds 2 m. On the other hand, as indicated by level 115, height H' of the massecuite above the calandria at the end of the boil is much smaller than in conventional evaporators and is, at most, about 0.5 m. The diameter of tubes 114 is at least 150 mm. As in the conventional apparatus, vessel 110 is equipped with mechanical agitator 124 entrained by motor 126.

Instead of heat exchange tubes 114, the calandria may comprise concentrically arranged hollow annular plates or other hollow heating elements having an equivalent hydraulic diameter. As explained in Chemical Engineers' Handbook, Fifth Edition, page 5-24 (Fluid Dynamics), McGraw-Hill Book Company, the hydraulic radius $R_H$ is defined by $$R_H = \frac{\text{area of stream cross section}}{\text{wetted perimeter}}$$

The hydraulic diameter $= 4\ R_H$.

According to the invention, the apparatus further comprises control 128 for regulating valve 127, which controls the flow of steam fed through inlet 118, and valve 129, which controls the flow of fresh syrup fed through inlet 122, so that the supersaturation of the mother liquor is maintained at a desired value and level 115 of the massecuite is held at a predetermined value and substantially constant during the entire boiling operation. To maintain the supersaturation at a desired value, which is variable during the operating cycle, a selected representative parameter of the state of the massecuite, such as its conductivity, its viscosity, its consistency, its density, etc., is measured and held at a level equal to a reference value which is function of the time elapsed since the beginning of the operating cycle. For example, the brix of the massecuite (which depends on the substances dissolved in the mother liquor plus the sugar present in the form of crystals) is measured by a gammadensimeter continuously or at short intervals of time, each measured value is compared to the corresponding reference value taken from the full-line curve in FIG. 3, and if there is a difference between the measured value and the reference value the device 128 changes the flow of steam and/or the flow of fresh syrup so as to reduce the difference to zero and cause the brix to vary according to the full-line curve in FIG. 3 and the supersaturation to vary according to the broken-line curve.

Figure 3:
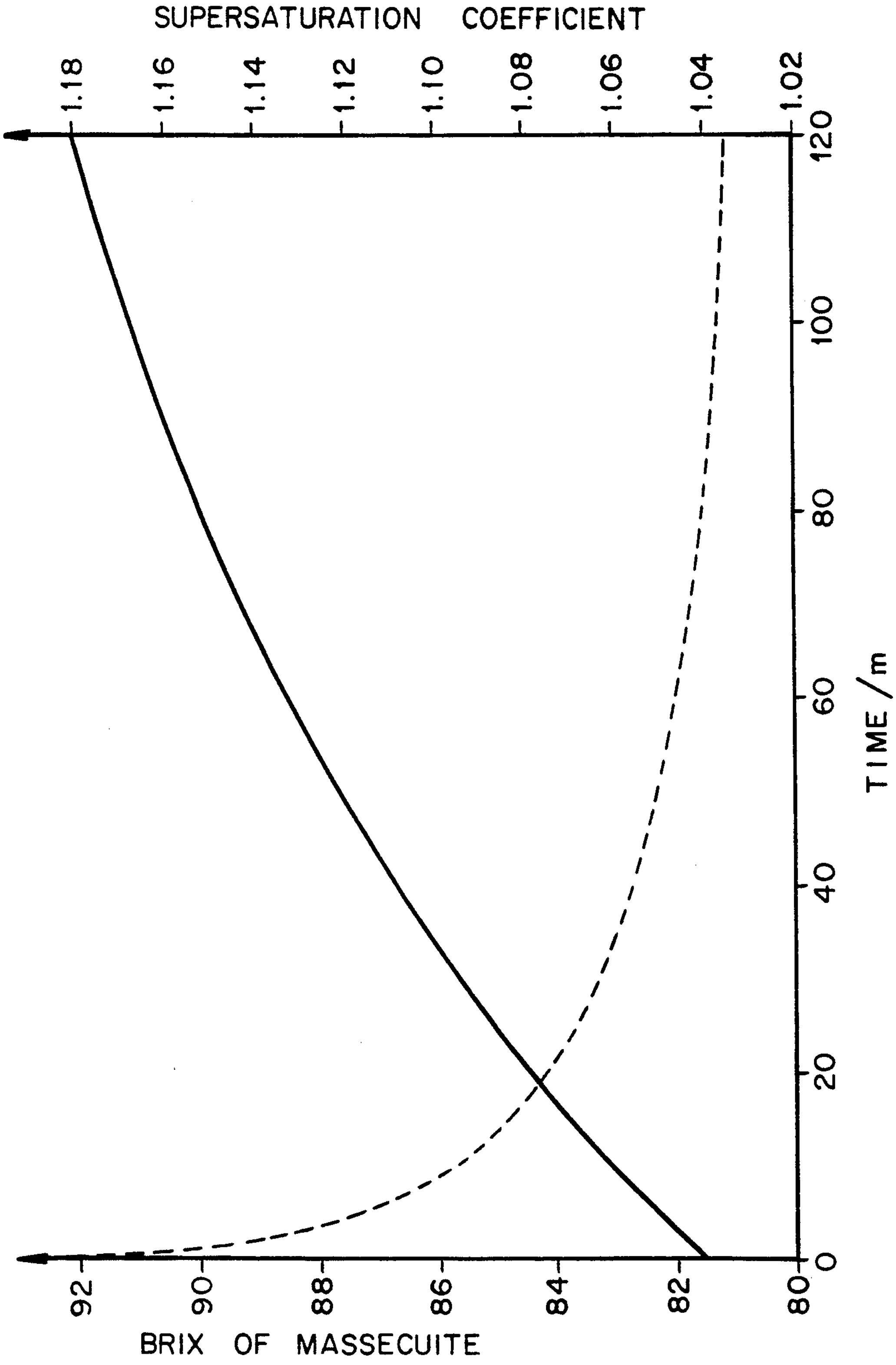
FIG. 3 shows a graph indicating the curves of the brix of the massecuite (full line) and the supersaturation (broken line) as a function of the elapsed time (in minutes).

In FIG. 3, time zero is the beginning of the sugar crystal growing phase which takes place immediately after the formation of the seeding magma. In the magma, the relative volume of the crystals is very small, and the brix at time zero is practically the same as that of the syrup.

An example of the way in which the invention can be carried out is given hereafter:

A batch of concentrated syrup having a purity P of 95 and a Brix Bx of 77 is fed to the crystallizing apparatus and is concentrated by evaporation to bring it to a state of supersaturation with a coefficient of supersaturation of 1,18. Seed crystals are then added to the supersaturated syrup to form a magma; the volume of the magma is about 70 m3. The magma is subjected to evaporation while fresh syrup is added thereto, and the flows of heating steam and fresh syrup are controlled so as to cause the brix of the massecuite and the supersaturation of the mother liquor to vary, respectively, in accordance with the curves in full-line and broken-line in FIG. 3; the brix of the final masse-cuite is about 92 and the supersaturation of the mother liquor is about 1,035. The final volume of masse-cuite is about 75 m3, which is only 7% larger than the volume of the seeding magma,while in conventional boiling pans the final volume of massecuite is three or four times larger than the volume of the seeding magma.

By raising the height of the heat exchange calandria and maintaining the level of the massecuite above the calandria relatively low, the heat exchange surface is increased and the maximum boiling temperature of the mother liquor is reduced, which makes it possible to use steam of a lower temperature. Furthermore, the agitation of the massecuite is more intense, which improves the uniformity of the sugar crystals size and reduces the length of the boiling. Finally, by tying the state of the massecuite to the time elapsed since the start of the operating cycle, rather than the level of the massecuite, as in conventional apparatus, the duration of the operating cycles can be maintained constant for all batches, which facilitates the operation of a sugar crystallization plant.

What is claimed is:

1. A batch process of producing sugar crystals from syrup in a discontinuously operated crystallization apparatus comprising a heat exchange calandria, which comprises the steps of (a) graining a batch of concentrated syrup by adding seed crystals thereto to form a volume of magma, (b) causing sugar crystals in the magma to grow by subjecting it to evaporation in heat exchange with the calandria and adding syrup to form a massecuite consisting of a mother liquor and sugar crystals, (c) measuring a parameter representative of the state of the massecuite, (d) comparing the measured value of the said parameter to a reference value which is a function of the time elapsed since the beginning of the sugar crystal growing phase, and (e) controlling the flow of steam to the calandria and the flow of added syrup so as to maintain the level of the massecuite substantially constant and to reduce to zero any difference between the measured value of the said parameter and the reference value.

2. A discontinuously operated crystallization apparatus for producing sugar crystals from syrup, which comprises:

(a) a closed vessel for receiving a flow of the syrup, (b) a heat exchange calandria at the bottom of the vessel, the calandria having a height of more than two meters and receiving a flow of steam, (c) a mechanical agitator for circulating the syrup fed into the vessel through the calandria, and (d) a control system comprising a first valve for controlling the flow of steam fed to the calandria, a second valve for controlling the flow of syrup fed to the vessel and a device controlling said first and second valves so as to hold the level of massecuite produced in the vessel below a maximum level of at most about 0.5 m above an upper plane of the calandria.

3. The apparatus o claim 2, wherein the calandria is comprised of vertical tubes having a diameter of at least 150 mm.

4. The apparatus of claim 2, wherein the calandria is comprised of hollow heating elements having hydraulic diameters which are equivalent to those of tubes having a diameter of at least 150 mm.

* * * * *